US012754072B2

(12) United States Patent
Horiuchi et al.

(10) Patent No.: US 12,754,072 B2
(45) Date of Patent: Oct. 6, 2026

(54) ULTRAVIOLET DETECTION MATERIAL

(71) Applicant: SHINKO ELECTRIC INDUSTRIES CO., LTD., Nagano (JP)

(72) Inventors: Michio Horiuchi, Nagano (JP); Masaya Tsuno, Matsumoto (JP)

(73) Assignee: SHINKO ELECTRIC INDUSTRIES CO., LTD., Nagano (JP)

(*) Notice: Subject to any disclaimer, the term of this patent is extended or adjusted under 35 U.S.C. 154(b) by 1077 days.

(21) Appl. No.: 17/591,297

(22) Filed: Feb. 2, 2022

(65) Prior Publication Data

US 2022/0244100 A1 Aug. 4, 2022

(30) Foreign Application Priority Data

Feb. 4, 2021 (JP) ................................ 2021-016876

(51) Int. Cl.
*G01J 1/58* (2006.01)
*C08K 3/22* (2006.01)

(52) U.S. Cl.
CPC *G01J 1/58* (2013.01); *C08K 3/22* (2013.01); *C08K 2003/2206* (2013.01); *C08K 2003/2213* (2013.01); *C08K 2003/2227* (2013.01); *C08K 2003/2262* (2013.01)

(58) Field of Classification Search
CPC .... G01J 1/58; G01J 1/429; C08K 3/22; C08K 2003/2206; C08K 2003/2213; C08K 2003/2227; C08K 2003/2262; C08K 2201/005; C04B 26/04; C04B 14/26; C04B 14/30; C04B 14/303; C04B 20/04; C04B 26/06; C04B 2111/80; C04B 2111/807
See application file for complete search history.

(56) References Cited

U.S. PATENT DOCUMENTS 12,162,768 B2 * 12/2024 Yamada .................... C01F 7/02
2010/0013078 A1 * 1/2010 Nagai ..................... H01L 24/29 257/734
2016/0081281 A1 * 3/2016 Horinek .................. C08K 3/36 47/65.5
2016/0181658 A1 * 6/2016 Kim ................. H01M 10/0569 429/188
2017/0342278 A1 * 11/2017 Zalich ...................... C09D 5/38
(Continued)

FOREIGN PATENT DOCUMENTS

JP 2018-154730 10/2018

OTHER PUBLICATIONS

Rattanakul et al., Inactivation kinetics and efficiencies of UV-LEDs against Pseudomonasaeruginosa, Legionella pneumophila, and surrogate microorganisms, Water Research 130 (2018) pp. 31-37, English text, Discussed in apecification, 7 pages.
(Continued)

*Primary Examiner* — Regina M Yoo
(74) *Attorney, Agent, or Firm* — Rankin, Hill & Clark LLP

(57) ABSTRACT

An ultraviolet detection material includes a composite oxide including aluminum, strontium, cerium, lanthanum and manganese, and an organic polymer. The ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

10 Claims, 6 Drawing Sheets

(56) References Cited

U.S. PATENT DOCUMENTS

| | | | | |
|---|---|---|---|---|
| 2019/0181435 | A1* | 6/2019 | Lee | H01M 10/052 |
| 2019/0198865 | A1* | 6/2019 | Kim | H01M 4/485 |
| 2019/0264101 | A1* | 8/2019 | Pousthomis | C09K 11/02 |
| 2019/0305278 | A1* | 10/2019 | Saeki | H01M 10/0587 |
| 2020/0048549 | A1* | 2/2020 | Hong | C09K 11/7708 |
| 2022/0123253 | A1* | 4/2022 | Seo | H10K 50/11 |

OTHER PUBLICATIONS

Beggs et al., Upper-room ultraviolet air disinfection might help to reduce COVID-19 transmission in buildings, medRxiv preprint doi:, https://doi.org/10.1101/2020.06.12.20129254; (2020), English text, 19 pages.

* cited by examiner

ULTRAVIOLET DETECTION MATERIAL

CROSS-REFERENCE TO RELATED APPLICATIONS

This application is based on and claims the benefit of priority from prior Japanese patent application No. 2021-016876 filed on Feb. 4, 2021, the entire contents of which are incorporated herein by reference.

TECHNICAL FIELD

The present invention relates to an ultraviolet detection material.

BACKGROUND ART

In general, ultraviolet refers to an electromagnetic wave having a wavelength of 400 nm or shorter. However, ultraviolet includes UV-A having a wavelength of 315 to 400 nm, UV-B having a wavelength of 280 to 315 nm, UV-C having a wavelength of 280 nm or shorter, and the like. A variety of methods of detecting the ultraviolet are being studied.

For example, an ultraviolet-excited fluorescent sheet or an ultraviolet-excited fluorescent ink using UV-C as an excitation source and having excellent fluorescence characteristics may be exemplified. Specifically, an ultraviolet detection material using UV-C having a wavelength of 200 to 280 nm as an excitation source and including an inorganic substance powder including an inorganic phosphor, which emits fluorescence having a peak in a wavelength of 400 to 700 nm, and a thermoplastic resin. In the ultraviolet detection material, the inorganic phosphor contains calcite-type (trigonal rhombohedral crystal) calcium carbonate, and the like (for example, refer to PTL 1).

In recent years, sterilization and virus inactivation effects of the ultraviolet have been attracting attention. Along with this, it is desired to accurately detect the ultraviolet that also affects human bodies. It is UV-C that has high sterilization and virus inactivation effects (for example, refer to NPTLs 1 and 2). It is also UV-C that highly affects human bodies. That is, it is the ultraviolet having a wavelength of 200 to 300 nm that has the sterilization effect, and the sterilization effect of UV-C is highest. Similarly, it is the ultraviolet having a wavelength of 200 to 310 nm that affects human bodies, and UV-C has the greatest effect on human bodies.

CITATION LIST

Patent Literature

PTL 1: JP-A-2018-154730

Non Patent Literature

NPTL1: Rattanakul et al, Inactivation kinetics and efficiencies of UV-LEDs against *Pseudomonas aeruginosa, Legionella pneumophila*, and surrogate microorganisms, Water Research 130(2018)31-37)

NPTL 2: Beggs et al, Upper-room ultraviolet air disinfection might help to reduce COVID-19 transmission in buildings, medRxiv preprint doi: https://doi.org/10.1101/2020.06.12.20129254; (2020)

SUMMARY OF INVENTION

However, despite a fact that UV-C having a relatively short wavelength has a great effect on living organisms and viruses, in the ultraviolet detection of the related art, it is difficult to detect only UV-C because it is not possible to distinguish wavelength regions of the ultraviolet. There is no description that the ultraviolet detection material disclosed in PTL 1 is excited only by UV-C, and it is thought that the ultraviolet detection material is excited even by an excitation wavelength other than UV-C.

The present invention has been made in view of the above situations, and an object thereof is to provide an ultraviolet detection material capable of distinctively detecting a wavelength region of UV-C.

An embodiment of the present disclosure relates to an ultraviolet detection material. The ultraviolet detection material comprises a composite oxide including aluminum, strontium, cerium, lanthanum and manganese, and an organic polymer. The ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

According to the disclosed technology, it is possible to provide the ultraviolet detection material capable of distinctively detecting a wavelength region of UV-C.

DESCRIPTION OF EMBODIMENTS

Figure 1:
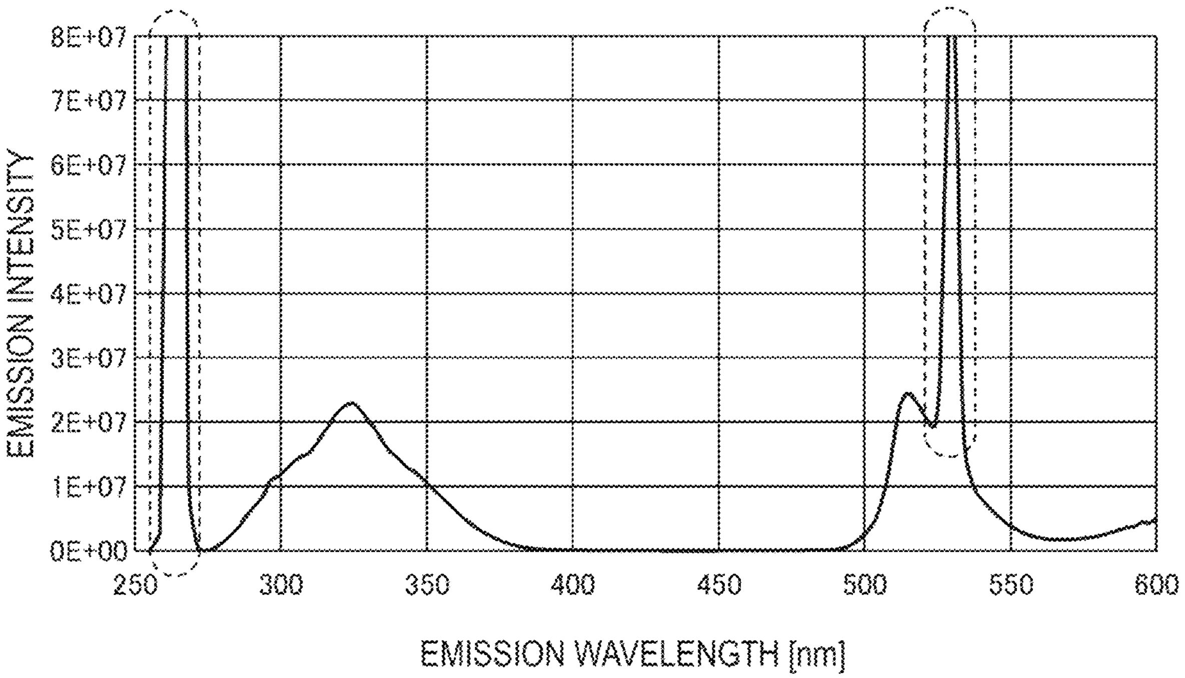
FIG. 1 shows a characteristic example of an ultraviolet detection material according to the present embodiment.

Hereinafter, embodiments of the present invention will be described with reference to the drawings. Note that, in the respective drawings, the parts having the same configurations are denoted with the same reference signs, and the overlapping descriptions may be omitted.

[Ultraviolet Detection Material]

An ultraviolet detection material according to the present embodiment (hereinafter, for convenience, referred to as 'ultraviolet detection material 10') is a mixture of a composite oxide in which a plurality of types of oxides is composited, and an organic polymer. The composite oxide included in the ultraviolet detection material 10 includes oxides of aluminum, strontium, cerium, lanthanum and manganese.

The ultraviolet detection material 10 is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter. That is, the ultraviolet detection material 10 is not excited even when irradiated with UV-A, but is excited to emit light when irradiated with UV-C. In order to facilitate the excitation with UV-C, the excitation wavelength peak of the ultraviolet detection material 10 is preferably 280 nm or shorter. Note that, in the ultraviolet detection material 10, it is the composite oxide that contributes to the light emission, and the organic polymer does not contribute to the light emission.

It is desirable that the organic polymer included in the ultraviolet detection material 10 has a transmissivity of 50% or more for an electromagnetic wave having a wavelength of 260 nm. In addition, a mixed amount (content rate) of the composite oxide in the ultraviolet detection material 10 is preferably 50 wt % or more. That is, since the organic polymer generally has the low ultraviolet transmissivity, it is preferable to select an organic polymer having high transmissivity at 280 nm or shorter, which is particularly a region of UV-C, and to use the organic polymer as little as possible. That is, the organic polymer is preferably used in a minimum amount necessary for binding particles of the composite oxide.

As a for a difference of the ultraviolet transmissivity depending on types of the organic polymer, for example, at 280 nm or shorter, polyvinyl butyral and polyacrylate show relatively high transmissivity, whereas polypropylene is slightly inferior, and polystyrene, polycarbonate, polyester, and polyvinyl chloride are significantly inferior. In addition, a plasticizer component that is often used together with the organic polymer has little transmissivity at wavelengths of 300 nm or shorter. Therefore, preferably, the ultraviolet detection material 10 does not contain the plasticizer component.

That is, examples of the desirable organic polymer that is used for the ultraviolet detection material 10 may include polyvinyl butyral resin and polyacrylate resin. When these resins are used, UV-C can be transmitted to some extent, without significantly hindering transmission of UV-C. Therefore, the ultraviolet detection material 10 can be excited to emit light at wavelengths in a visible light region when irradiated with UV-C.

The organic polymer included in the ultraviolet detection material 10 is preferably soluble in ethanol. This is because the ultraviolet detection material 10 can be easily removed when it is no longer needed. Note that, the polyvinyl butyral resin and the polyacrylate resin are soluble in ethanol.

FIG. 1 shows a characteristic example of the ultraviolet detection material according to the present embodiment, showing emission intensity when the ultraviolet detection material 10 is excited by electromagnetic waves having excitation wavelengths near 265 nm. In FIG. 1, the strong light emission can be seen in the ultraviolet light region of 300 nm to 350 nm and in the visible light region of 500 nm to 550 nm (green band, the peak wavelength is about 520 nm). That is, the ultraviolet detection material 10 is excited to emit light at a wavelength in the visible light region (for example, the green band) when irradiated with the electromagnetic wave near 265 nm. In FIG. 1, two parts surrounded by the dashed line are Rayleigh scattering (measurement noises) and are not the light emission of the ultraviolet detection material 10.

Figure 2:
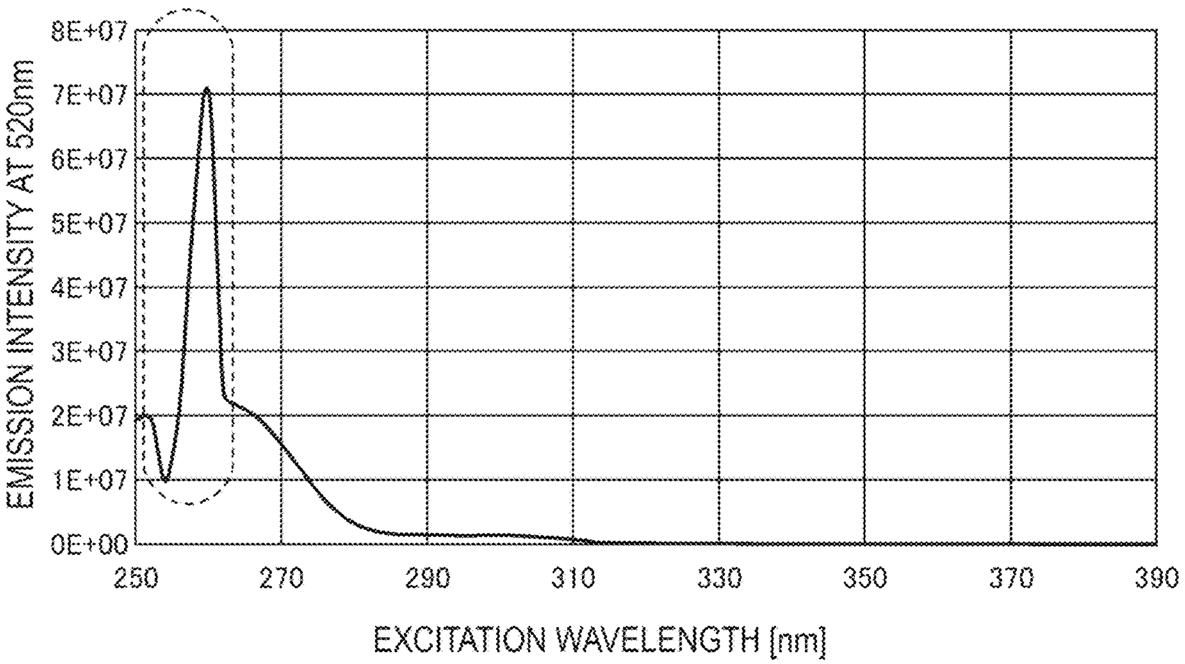
FIG. 2 shows a characteristic example of the ultraviolet detection material according to the present embodiment.

FIG. 2 shows a characteristic example of the ultraviolet detection material according to the present embodiment, showing excitation wavelengths of electromagnetic waves that can excite the ultraviolet detection material 10 at 520 nm. It can be seen from FIG. 2 that the ultraviolet detection material 10 is strongly excited by the electromagnetic waves having wavelengths of 280 nm or shorter and is also excited even by the electromagnetic waves having wavelengths longer than 280 nm and equal to or shorter than 310 nm. In addition, it can be seen from FIG. 2 that the ultraviolet detection material 10 is not excited even when irradiated with the electromagnetic waves having wavelengths longer than 310 nm.

In FIG. 2, a part surrounded by the dashed line is Rayleigh scattering (measurement noises) and is not the light emission of the ultraviolet detection material 10. In addition, since a xenon lamp was used as a light source for measuring the characteristic, the measurement was performed at the excitation wavelengths of 250 nm or longer. However, inferring from a shape on a short wavelength-side of the spectrum shown in FIG. 2, it is thought that the ultraviolet detection material 10 is excited even at the excitation wavelengths equal to or longer than 200 nm and shorter than 250 nm, thereby emitting light at the wavelength in the visible light region. Note that, since wavelengths shorter than 200 nm become a region called vacuum ultraviolet that easily absorbs oxygen and nitrogen, there is little need to discuss the sterilization effect, the virus inactivation effect, the effect on human bodies, and the like. Therefore, in the present disclosure, it is sufficient to consider wavelengths of 200 nm or longer.

Note that, the ultraviolet detection material 10 may be excited to emit light having a peak of an emission wavelength in 480 nm or longer and 700 nm or shorter by an electromagnetic wave having a wavelength of 310 nm or shorter, and the peak of the emission wavelength may also be in a region other than 500 nm to 550 nm.

Figure 3:
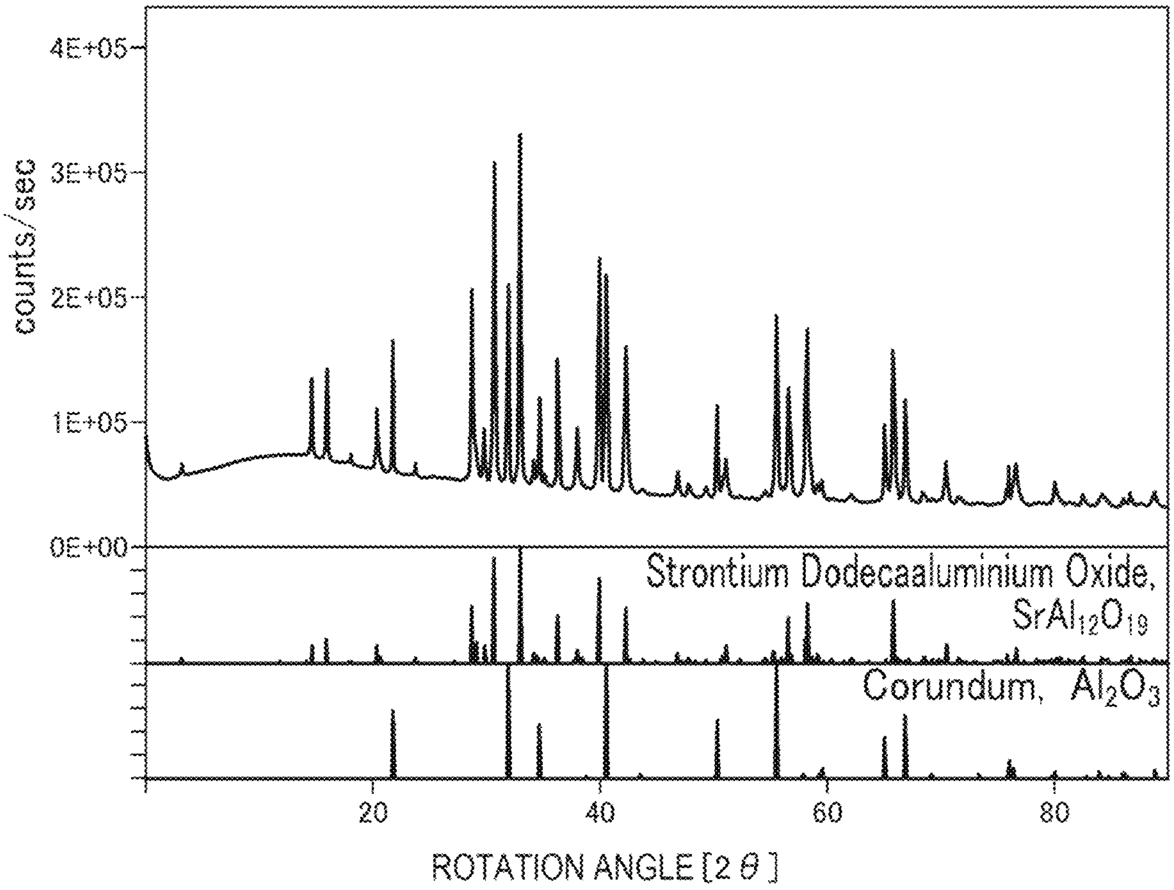
FIG. 3 shows an example of X-ray diffraction patterns of a composite oxide included in the ultraviolet detection material according to the present embodiment.

FIG. 3 shows an example of X-ray diffraction patterns of a composite oxide included in the ultraviolet detection material according to the present embodiment. As shown in FIG. 3, the ultraviolet detection material 10 has $SrAl_{12}O_{19}$ (hexagonal system) as a main phase and $Al_2O_3$ (corundum) as a sub-phase in a crystal phase. Ce, La and Mn are not detected by the X-ray diffraction. In other words, Ce, La and Mn are present in the composite oxide in such a form that they are not detected by the X-ray diffraction.

It is thought that strontium reacts with aluminum oxide to form $SrAl_{12}O_{19}$ phase, which is a main phase of the composite oxide, during firing and serves as a host of the light emission center element. It is also thought that aluminum reacts with strontium carbonate or its decarboxylated oxide to form $SrAl_{12}O_{19}$ phase, which is a main phase of the composite oxide, during firing, serves as a host of the light emission center element and is also stably present as a single corundum phase.

[Manufacturing Method of Ultraviolet Detection Material]

Figure 4:
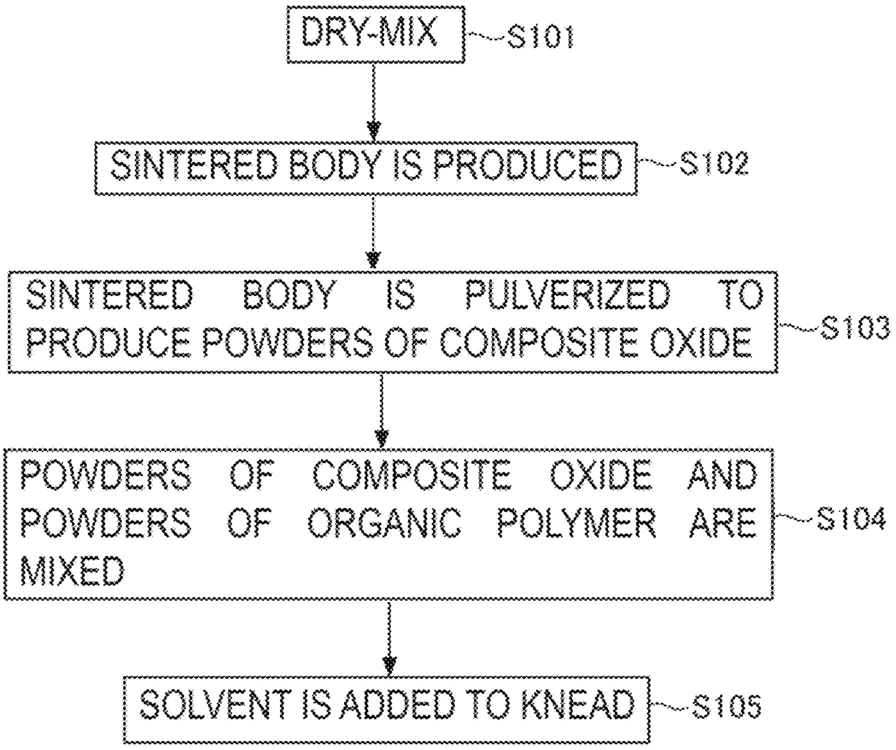
FIG. 4 is a flowchart showing a manufacturing method of the ultraviolet detection material according to the present embodiment.

FIG. 4 is a flowchart showing a manufacturing method of the ultraviolet detection material according to the present embodiment. As shown in FIG. 4, in order to manufacture the ultraviolet detection material 10, powders of a plurality of types of oxides, each of the oxides including at least one of aluminum, strontium, cerium, lanthanum and manganese are first dry-mixed in step S101. For example, aluminum oxide powders, strontium carbonate powders, cerium oxide powders, and lanthanum strontium manganese oxide powders are dry-mixed.

Next, in step S102, the powders of the plurality of types of oxides dry-mixed in step S101 are formed into a predetermined shape and fired at a temperature (for example, 1500° C.) equal to or higher than 1200° C. in the atmosphere. This produces a sintered body of the composite oxide including the above-described oxides. The main phase in the crystal phase of the sintered body produced in step S102 is $SrAl_{12}O_{19}$. Note that, if the firing is performed at a temperature lower than 1200° C., the yield of the ultraviolet detection material capable of distinctively detecting a wavelength region of UV-C is significantly lowered.

Next, in step S103, the sintered body produced in step S102 is pulverized to produce powders of the composite oxide. For pulverization, for example, a general-purpose pulverizer can be used. By adjusting pulverizing conditions of the pulverizer, it is possible to control an average particle size of the powders of the composite oxide. In order to stably emit visible light during irradiation of UV-C, the average particle size of the powders of the composite oxide is preferably equal to or greater than 100 μm. On the other hand, from standpoints of applying, printing and formability, the average particle size of the powders of the composite oxide is preferably equal to or smaller than 500 μm. Note that, the average particle size can be measured by a method using a normal particle size distribution measuring machine, a method of obtaining the average particle size from sedimentation rates of particles in a liquid medium by using the Stokes' law, and the like.

Next, in step S104, powders of an organic polymer are prepared, and the powders of the composite oxide and the powders of the organic polymer are mixed to produce a mixture A. The organic polymer used in step S104 is, for example, polyvinyl butyral resin, polyacrylate resin or the like.

Next, in step S105, a predetermined solvent (ethanol or the like) is added to the mixture A produced in step S104 to dissolve and knead the component of the organic polymer, thereby producing a mixture B in liquid or paste form. The produced mixture B is the ultraviolet detection material 10. Note that, a mixed amount (content rate) of the composite oxide in the mixture B is preferably 50 wt %[1] or more.

Hereinafter, Examples are described. However, the present invention is not limited to these Examples.

Example 1

100 parts by weight of aluminum oxide powders, 12 parts by weight of strontium carbonate powders, 2.3 parts by weight of cerium oxide powders and 2.3 parts by weight of lanthanum strontium manganese oxide powders were dry-mixed and then fired at 1500° C. for 10 hours in the atmosphere, so that a sintered body was obtained. The molar concentration of each oxide component is 89.4 mol % for $Al_2O_3$, 7.6 mol % for SrO, 1.2 mol % for $CeO_2$, 0.8 mol % for $La_2O_3$, and 1.0 mol % for $MnO_2$.

The molar concentration of each of the above-described oxide components is converted from the weight. Note that, the strontium carbonate powders are changed to SrO by firing.

Next, the sintered body was pulverized to produce powders of the composite oxide. The average particle size of the produced powders of the composite oxide was equal to or greater than 100 μm and equal to or smaller than 500 μm. Then, 100 parts by weight of the powders of the composite oxide and 10 parts by weight of the powders of polyvinyl butyral resin were mixed, and ethanol was added to the mixture to dissolve and knead the resin component, so that an ultraviolet detection material 10A in paste form was produced.

Example 2

100 parts by weight of the powders of the composite oxide prepared in a similar manner to Example 1 and 10 parts by weight of powders of polymethylacrylate resin were mixed, and ethyl acetate was added to the mixture to dissolve and knead the resin component, so that an ultraviolet detection material 10B in paste form was produced.

[Check for Light Emission]

Figure 5A:
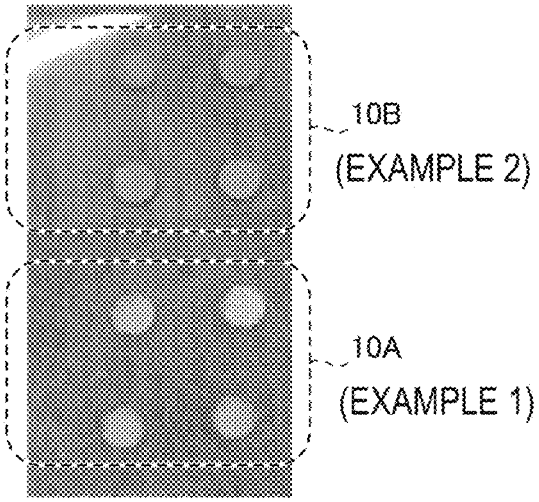
FIG. 5A shows results of Examples.

The ultraviolet detection material 10A in paste form produced in Example 1 and the ultraviolet detection material 10B in paste form produced in Example 2 were printed and dried on a polyethylene terephthalate film. FIG. 5A shows an aspect where the dried ultraviolet detection materials 10A and 10B were irradiated with a fluorescent lamp, for reference.

Figure 5B:
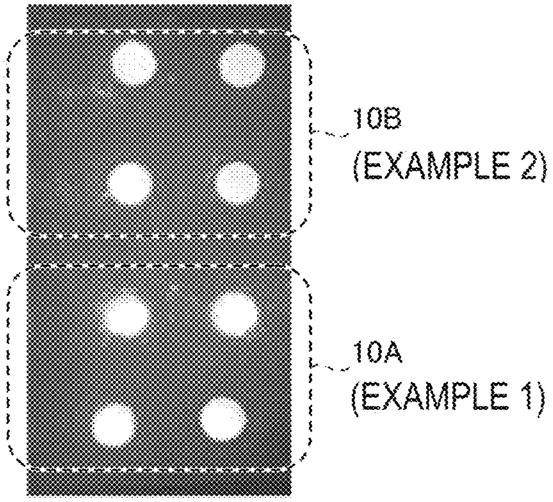
FIG. 5B shows results of Examples.

Next, the dried ultraviolet detection materials 10A and 10B were sequentially irradiated with ultraviolets having wavelengths of 365 nm and 254 nm by an ultraviolet exposure apparatus, and the presence or absence of the light emission was checked. As a result, neither the ultraviolet detection material 10A produced in Example 1 nor the ultraviolet detection material 10B produced in Example 2 emitted the light at the excitation wavelength of 365 nm. At the excitation wavelength of 254 nm, the strong green-white light emission was checked, as shown in FIG. 5B. Note that, 365 nm is ultraviolet belonging to UV-A, and 254 nm is ultraviolet belonging to UV-C.

As described above, the ultraviolet detection materials 10A and 10B relating to Examples 1 and 2 emitted lights in different light emission aspects under irradiations of UV-A and UV-C. That is, the ultraviolet detection materials did not emit light under irradiation of UV-A but strongly emitted lights under irradiation of UV-C. Therefore, by using the ultraviolet detection materials 10A and 10B relating to Examples 1 and 2, it is possible to detect the presence or absence of irradiation of UV-C.

Note that, the molar concentrations of the respective oxide components of the composite oxide shown in Examples 1 and 2 are just exemplary. The molar concentrations of the respective oxide components can be changed as appropriate. For example, the molar concentration of aluminum oxide may be changed within a range of 84.9 or more and 93.8 or less in molar percent, the molar concentration of strontium oxide may be changed within a range of 7.2 or more and 8.0 or less in molar percent, the molar concentration of cerium oxide may be changed within a range of 1.1 or more and 1.3 or less in molar percent, the molar concentration of lanthanum oxide may be changed within a range of 0.8 or more and 0.9 or less in molar percent and the molar concentration of manganese oxide may be changed within a range of 1.0 or more and 1.1 or less in molar percent, respectively.

As described above, the ultraviolet detection material according to the present embodiment includes the composite oxide including aluminum, strontium, cerium, lanthanum and manganese, and the organic polymer, is not excited by the electromagnetic wave having a wavelength longer than 310 nm and is excited by the electromagnetic wave having a wavelength equal to or shorter than 310 nm, thereby emitting light having a peak of an emission wavelength in 480 nm or longer and 700 nm or shorter. For this reason, the presence or absence and the reachable range of irradiation of UV-C, which highly affects the living organism and viruses, can be visually checked by the light emission having a wavelength in the visible light region, so that the wavelength region of ultraviolet can be distinctively detected.

In addition, according to the ultraviolet detection material of the present embodiment, it is not necessary to supply the energy for detection of UV-C, so that it is possible to detect UV-C promptly and conveniently at low cost. Further, since the ultraviolet detection material of the present embodiment can be formed into a specific shape and applied to a test object or a test place by mixing with the organic polymer, a degree of freedom in a use method can be improved.

On the other hand, even an organic polymer showing relatively high ultraviolet transmissivity is lowered in transmissivity and deteriorated in mechanical strength by ultraviolet exposure for a long time. Therefore, the ultraviolet detection material of the present embodiment is preferably used in such an aspect that detection of a UV-C region can be performed promptly and conveniently and replacement can be easily performed, not an aspect where it is used in a fixed form for a long time.

A specific use example is that the ultraviolet detection material of the present embodiment is formed into a film shape provided with an adhesive layer, is pasted to a test object or a test place, and is then peeled off after performing detection of UV-C (checking the reach, the presence or absence of occurrence, or the like). Alternatively, the ultraviolet detection material of the present embodiment is applied to a test object or a test place in liquid form or in paste form, and is then wiped off with alcohol or the like after detection of UV-C. In order to implement the latter use method, the used organic polymer is preferably dissolved in alcohol, and polyvinyl alcohol, polyvinyl butyral or the like is desirably used.

Although the preferred embodiment and the like have been described in detail, the present invention is not limited to the above-described embodiment and the like, and a variety of changes and replacements can be made for the above-described embodiment and the like without departing from the scope defined in the claims.

This disclosure further encompasses various exemplary embodiments, for example, described below.

[1] A manufacturing method of an ultraviolet detection material, the manufacturing method comprising:

producing powders of a composite oxide including aluminum, strontium, cerium, lanthanum and manganese;

producing a mixture of powders of the composite oxide and powders of an organic polymer; and adding a solvent to the mixture and kneading the mixture, wherein the producing of powders of the composite oxide comprises:

mixing and firing powders of a plurality of types of oxides, each of the oxides including at least one of aluminum, strontium, cerium, lanthanum and manganese, at a temperature of 1200° C. or higher in the atmosphere, thereby producing a sintered body of the composite oxide, and pulverizing the sintered body to produce powders of the composite oxide, and wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

What is claimed is:

1. An ultraviolet detection material comprising:

a composite oxide formed from a plurality of types of oxides, the plurality of types of oxides consisting of aluminum oxide, strontium oxide, cerium oxide, and lanthanum strontium manganese oxide; and an organic polymer, wherein the ultraviolet detection material is not excited by an electromagnetic wave having a wavelength longer than 310 nm and is excited by an electromagnetic wave having a wavelength equal to or shorter than 310 nm, thereby emitting light having a peak of an emission wavelength in 480 nm or longer and 700 nm or shorter.

2. The ultraviolet detection material according to claim 1, wherein an excitation wavelength peak is 280 nm or shorter.

3. The ultraviolet detection material according to claim 1, wherein the organic polymer has a transmissivity of 50% or more for an electromagnetic wave having a wavelength of 260 nm.

4. The ultraviolet detection material according to claim 1, wherein the composite oxide is 50 wt % or more of the ultraviolet detection material.

5. The ultraviolet detection material according to claim 1, wherein the organic polymer is soluble in ethanol.

6. The ultraviolet detection material according to claim 1, wherein the organic polymer is polyvinyl butyral resin or polyacrylate resin.

7. The ultraviolet detection material according to claim 1, wherein the composite oxide has an average particle size of 100 μm or greater.

8. The ultraviolet detection material according to claim 1, wherein the organic polymer is polyvinyl butyral resin.

9. The ultraviolet detection material according to claim 1, wherein the organic polymer is polyacrylate resin.

10. The ultraviolet detection material according to claim 1, wherein, in the composite oxide, a molar concentration of the aluminum oxide is in a range of 84.9 or more and 93.8 or less in molar percent, a molar concentration of strontium oxide is in a range of 7.2 or more and 8.0 or less in molar percent, a molar concentration of cerium oxide is in a range of 1.1 or more and 1.3 or less in molar percent, a molar concentration of lanthanum oxide is in a range of 0.8 or more and 0.9 or less in molar percent, and a molar concentration of manganese oxide is in a range of 1.0 or more and 1.1 or less in molar percent.

* * * * *